(12) United States Patent
Janakiraman et al.

(10) Patent No.: US 12,505,749 B2
(45) Date of Patent: Dec. 23, 2025

(54) SYSTEMS AND METHODS FOR BI-DIRECTIONAL COMMUNICATION BETWEEN ONE OR MORE VEHICLES AND A CLOUD BASED COMPUTING SYSTEM

(71) Applicant: Honeywell International Inc., Charlotte, NC (US)

(72) Inventors: Kirupakar Janakiraman, Madurai (IN); Kalimulla Khan, Bangalore (IN); Todd Mathis, Phoenix, AZ (US); Ramkumar Rajendran, Theni District (IN); Srihari Jayathirtha, Bangalore (IN); Subhransu Sahoo, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 241 days.

(21) Appl. No.: 17/808,262

(22) Filed: Jun. 22, 2022

(65) Prior Publication Data

US 2023/0177966 A1 Jun. 8, 2023

(30) Foreign Application Priority Data

Dec. 6, 2021 (IN) .............................. 202111056457

(51) Int. Cl.
*G08G 5/30* (2025.01)
*G07C 5/00* (2006.01)
(Continued)

(52) U.S. Cl.
CPC ............... *G08G 5/30* (2025.01); *G07C 5/006* (2013.01); *G08G 5/25* (2025.01); *G08G 5/55* (2025.01); *G08G 5/59* (2025.01)

(58) Field of Classification Search
None
See application file for complete search history.

(56) References Cited

U.S. PATENT DOCUMENTS 11,146,927 B2 * 10/2021 Panergo ................. G06F 9/541
2003/0126298 A1 * 7/2003 Redford .............. H04L 12/2856
709/250
(Continued)

FOREIGN PATENT DOCUMENTS

EP 3483860 A1 5/2019

OTHER PUBLICATIONS

Outgoing—ISA/210—International Search Report and Written Opinion Mailed on Apr. 12, 2023 for WO Application No. PCT/US22/081009, 10 page(s).

*Primary Examiner* — Christian Chace
*Assistant Examiner* — Shayne M. Gilbertson
(74) *Attorney, Agent, or Firm* — ALSTON & BIRD LLP

(57) ABSTRACT

Disclosed are methods and systems for bi-directional communication between one or more vehicles and a cloud based computing system. For instance, a method may include processing, by a first digital twin of the cloud based computing system, a first request received from and/or sent to a gateway unit associated with a first vehicle, the request comprising data related to one or more vehicle operations; validating, by an avionics data processing service (ADPS) in communication with the gateway unit, the first request against an operational parameter corresponding to the one or more vehicle operations; upon validating the first request, matching, by the ADPS, the operational parameter with a flight operation; and upon matching the operational parameter with the flight operation, inserting, by the ADPS, a modified flight operation into the flight management system of the vehicle.

20 Claims, 7 Drawing Sheets

(51) Int. Cl.
    *G08G 5/25*     (2025.01)
    *G08G 5/55*     (2025.01)
    *G08G 5/59*     (2025.01)

(56) References Cited

U.S. PATENT DOCUMENTS

| | | | | |
|---|---|---|---|---|
| 2011/0246053 | A1* | 10/2011 | Coulmeau | G08G 5/0013 |
| | | | | 701/120 |
| 2018/0365265 | A1* | 12/2018 | Blanc | G08G 5/0034 |
| 2018/0366008 | A1 | 12/2018 | Dacre-Wright et al. | |
| 2019/0138662 | A1* | 5/2019 | Deutsch | G06F 30/00 |
| 2019/0164433 | A1* | 5/2019 | MacDowell | G08G 5/32 |
| 2019/0243504 | A1* | 8/2019 | Shamasundar | G08G 5/0039 |
| 2020/0226940 | A1 | 7/2020 | Srinivasan et al. | |
| 2020/0342771 | A1* | 10/2020 | Mohan | G06Q 10/083 |
| 2021/0097869 | A1* | 4/2021 | Piradi | G08G 5/0021 |

* cited by examiner

SYSTEMS AND METHODS FOR BI-DIRECTIONAL COMMUNICATION BETWEEN ONE OR MORE VEHICLES AND A CLOUD BASED COMPUTING SYSTEM

RELATED APPLICATION

This application claims the benefit of priority to Indian Provisional Application No. 202111056457, filed Dec. 6, 2021, which is incorporated herein by reference in its entirety.

TECHNICAL FIELD

Various embodiments of the present disclosure relate generally to vehicle communication and, more particularly, to systems and methods for bi-directional communication between one or more vehicles and a cloud based computing system.

BACKGROUND

Aircraft connectivity has progressed substantially in recent years. For instance, one area of progress has been in augmenting solutions in cockpit, cabin, offboard the aircraft, and other areas like aircraft maintenance and performance optimization. Moreover, reliable connectivity provides avenues of new software and data distribution models. For instance, avionic service providers may provide, among other things, cockpit functions like flight management, enhanced ground proximity warning, and terrain awareness.

More generally, under current approaches, data transfer to the aircraft can require physical access to the aircraft by crew and/or maintenance personnel to update features, such as flight plans, operational parameters, and the like. In addition, operational parameter updates can typically only occur during a particular time frame or maintenance cycle and not necessarily during or prior to routine operations. This limits turn-around time that relies upon such data transfer to when crew makes the updates, manual data entry errors, and delay in insertion of valuable insights.

Therefore, a need exists for an intelligent system within the flight management system (FMS) that identifies the relevant information for a flight operation (e.g., a particular mission) and retrieves the same from a pre-configured data source.

The present disclosure is directed to overcoming one or more of these above-referenced challenges.

SUMMARY OF THE DISCLOSURE

According to certain aspects of the disclosure, systems and methods are disclosed for bi-directional communication between one or more vehicles and a cloud based computing system.

In some aspects, a non-transitory computer-readable medium is disclosed with instructions that, when executed by a processor, cause a method to be performed. The method can include providing bi-directional communication connectivity, via an avionics data processing service (ADPS), between a vehicle, a gateway unit and/or a cloud based computing system. The vehicle can have a processor configured to control one or more on-board avionics control functions of the vehicle using the ADPS to transmit, via a cloud based computing system, data between the gateway unit and the vehicle, the data having one or more requests related to operations of the vehicle. The ADPS can be further configured to validate the transmitted data against an operational parameter corresponding to operations of the vehicle; match the operational parameter with a flight operation; and insert a modified flight operation, based on matching the operational parameter with the flight operation, into a flight management system of the vehicle.

In some aspects, the processor using the ADPS is further configured to transmit an acknowledgment notification to the cloud based computing system and/or one or more computing systems in communication with the cloud based computing system that the operational parameter has been matched and/or the modified flight operation inserted into the flight management system.

In some aspects, the ADPS is resident to a computing system of the vehicle or resident to a computing system in remote communication with the vehicle via the cloud based computing system.

In some aspects, the ADPS is a separately space and time partitioned multi-mode data acquisition agent configured to control one or more avionics onboard the vehicle for onboard avionics control functions.

In some aspects, the processor using the ADPS transmits the data having the one or more requests during an initialization process of the flight management system of the vehicle or on a trigger from the flight management system or a computing system remotely connected therewith via the cloud based computing system.

In some aspects, the processor using the ADPS is further configured to in response to determining that the modified flight operation has been successfully accessed and/or activated by the flight management system of the vehicle, remove the modified flight operation from the cloud based computing system.

In some aspects, the step of transmitting the data includes identifying data for a predetermined vehicle operation; and selectively retrieving predetermined vehicle operation data from one or more databases of the cloud based computer system to execute the predetermined vehicle operation.

In some aspects, the processor using the ADPS is further configured to cause the one or more requests to be received by the flight management system during or just prior to the flight operation so that a gateway communication interface of the vehicle connects to the cloud based computing system and searches for data relevant to the one or more requests.

In some aspects, the processor using the ADPS is further configured to selectively retrieve, from one or more databases connected to the cloud based computing system, one or more discrete entries associated with the flight operation and/or historical vehicle performance data of the vehicle; and insert the retrieved one or more discrete entries into the flight management system of the vehicle.

In some aspects, the processor using the ADPS is further configured to automatically transmit one or more current vehicle operations data to at least one digital twin of the cloud based computing system rendering accessible the one or more current vehicle operations data by one or more computing systems in communication with the cloud based computing system.

In some aspects, the flight management system is onboard the vehicle. The processor using the ADPS can be further configured to synchronize the transmitted data and the modified flight operation between the flight management system, a gateway interface device, and the cloud based computing system in real-time and/or at one or more predetermined intervals.

In some aspects, the gateway interface device provides connectivity between a plurality of nodes of the cloud based computing system and the flight management system by functioning as an access point.

In some aspects, the ADPS communicates with at least one node of the plurality of nodes of the cloud computing system directly through the gateway interface.

In some aspects, the one or more requests are received from a client application executed on a mobile device, an aircraft LRU system that is external to the flight management system, a ground based computing system, and/or another cloud based computing system.

In some aspects, a method is disclosed. The method can include processing, by a first digital twin of a cloud based computing system, a first request received from and/or sent to a gateway unit associated with a first vehicle, the first request having data related to one or more vehicle operations; validating, by a first avionics data processing service (ADPS) in communication with the gateway unit, the first request against an operational parameter corresponding to the one or more vehicle operations; upon validating the first request, matching, by the first ADPS, the operational parameter with a flight operation; and upon matching the operational parameter with the flight operation, inserting, by the ADPS, a modified flight operation into a flight management system of the first vehicle.

In some aspects, the method can include processing, by a second digital twin of the cloud based computing system, a second request received from and/or sent to a second gateway unit associated with a second vehicle, the second request having data related to one or more second vehicle operations; validating, by a second avionics data processing service (ADPS) in communication with the second gateway unit, the second request against a second operational parameter corresponding to the one or more second vehicle operations; an upon validating the second request, matching, by the second ADPS, the second operational parameter with a second flight operation; and upon matching the second operational parameter with the second flight operation, inserting, by the ADPS, a second modified flight operation into the flight management system of the second vehicle.

In some aspects, the method can include transmitting, by the first and/or second ADPS, an acknowledgment notification to a respective first and/or second digital twin that the operational parameter has been matched and/or the respective first and/or second modified flight operation inserted into the flight management system of the first and/or second vehicle.

In some aspects, the method ca include upon determining that the modified flight operation has been accessed and/or activated by the flight management system of the first vehicle, removing the modified flight operation, by the first ADPS, from the cloud based computing system.

In some aspects, a network node on an aircraft is disclosed having an onboard flight management system (FMS) and an FMS service layer having a networked node server. The networked node server can be configured to process, by a first digital twin, a first request received from and/or sent to a gateway unit associated with the aircraft, the request having data related to one or more aircraft operations; validate, by an avionics data processing service (ADPS) in communication with the gateway unit, the first request against an operational parameter corresponding to the one or more aircraft operations; upon validating the first request, match, by the ADPS, the operational parameter with a flight operation; and upon matching the operational parameter with the flight operation, insert, by the ADPS, a modified flight operation into the onboard flight management system of the aircraft.

In some aspects, the networked node server is configured to transmit, by the ADPS, an acknowledgment notification to the first digital twin that the operational parameter has been matched and/or the modified flight operation inserted into the onboard flight management system.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that multiple parties utilize remote and/or offboard aircraft operation management so as to minimize data loss previously known to exist, reduce pilot workload, and minimize data entry errors. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
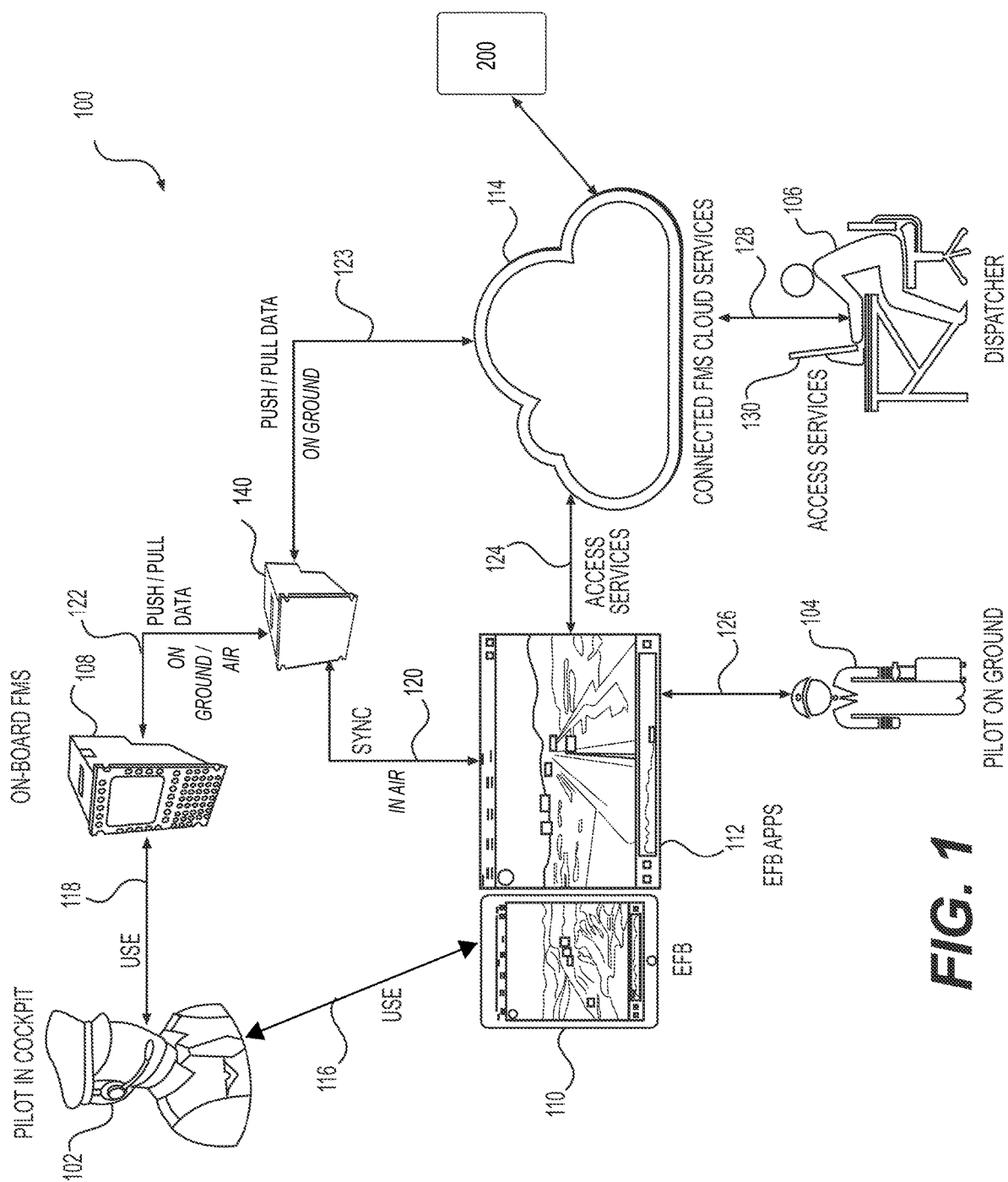
FIG. 1 depicts an overview of an example environment in which systems, methods, and other aspects of the present disclosure may be implemented.

Various embodiments of the present disclosure relate generally to vehicle communication and, more particularly, to system and methods for bi-directional communication between one or more vehicles and a cloud computing system.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

While this disclosure describes the systems and methods with reference to controlling operations of a vehicle such as an aircraft (e.g., aircraft avionics systems, crew interface, etc.), it should be appreciated that the present systems and methods are applicable to management of other vehicle features, including those of drones, automobiles, trains (locomotives), or any other autonomous and/or Internet-connected vehicle (e.g., a car, a semi-truck, a fleet of any sort of vehicle).

In the connected aircraft environment, there is an increasing need for remote connectivity to the aircraft for transferring data and insights on routine basis. Parameters, such as one or more flight plans, flight management system(s) (FMS), operational settings (e.g., performance factor), and/or cost index, can periodically need updating remotely based on advanced ground-based analytics and/or tools. For example, a general aviation pilot may want to be able to file a flight plan remotely (e.g., from home, in the airport pre-flight, or from a hotel) and have this flight plan automatically downloaded in the flight management system of the aircraft on the day of flight. Similarly, a maintenance engineer sitting in her office may want to change aircraft performance factor(s) for multiple aircrafts based on aircraft performance monitor (APM) software results, which can be generated periodically or in response to any predetermined changes to the aircraft configuration. The maintenance engineer may also want to remotely update a discrete entries, such as a cost index, from the maintenance engineer's computing system.

With current cockpit infrastructure, data transfer to the aircraft requires physical access to the aircraft by crew or the maintenance personnel to update such parameters. In addition, operational parameter updates which require maintenance personnel to access the aircraft can only occur during a predetermined time frame (e.g., the next maintenance cycle) and not during routine operations. This results in increased turn-around time (e.g., when the crew performs the update(s)) and potential data entry errors and related delay in insertion of valuable insights. Accordingly, there is a need for an intelligent system within a flight management system that identifies relevant information for the flight mission and retrieves the same from a pre-configured data source (e.g., the cloud, the operator repository, etc.).

The systems and methods disclosed herein relate to an intelligent data transfer system that can reside in an avionics data processing service (ADPS) in communication with a gateway interface of a flight management system (FMS) onboard and/or offboard the vehicle. The systems and methods of the present disclosure may use the ADPS for bi-directional data transfer between the FMS and may be operationally remote therefrom. During an initialization process of the FMS or on a trigger from FMS (e.g., flight identification entry, specific pilot request for data update, etc.), the system can use the ADPS to identify all the necessary data for a flight operation (e.g., a particular flight mission) and retrieve the same and/or update the current flight operation with a modified flight operation, as needed. For example, when the crew selects an option to update in the FMS, the ADPS can be configured to connect to the cloud server to locate one or more flight plans uploaded for the particular mission. After validating the flight plan data against the current mission, the ADPS can insert this flight plan into the FMS using the ADPS data ingestion mechanisms.

In addition to flight plans, discrete entries (e.g., the cost index for the flight, performance factor, etc.) can be retrieved and inserted into the FMS. Further, certain on-ground applications that provide the required data to an onboard FMS (e.g., the flight planning tool, aircraft performance monitoring applications, etc.) can, in tandem with the ADPS, independently generate the information for the flight and upload in the appropriate data store with proper identity and formats.

The ADPS of the present disclosure can also be extended to automatically upload current and/or future flight information (e.g., aircraft state, trajectory data, BITE data, etc.). The ADPS can also be configurable to at least one corresponding repository (e.g., a digital twin in a cloud server) for access to ground or other in-air applications.

Referring now to the appended drawings, FIG. 1 shows an overview of an example environment 100, according to one or more embodiments of the present disclosure for bi-directional data communication. The environment 100 may be an example of an FMS platform that may receive requests related to operations of a vehicle, process one or more vehicle operation requests, and transmits responses to the one or more vehicle operation requests (e.g., acknowledgment notifications) based on the processed requests. The environment 100 may, for example, include an electronic flight bag (EFB) 110, an on-board FMS 108, a connected FMS cloud services platform 114, a gateway interface device 140 which acts as a hub between the EFB, FMS 108, and the FMS cloud services platform 114, and/or a dispatcher device 130. The FMS cloud services platform 114 can be "a cloud based computing system", which can include one or more cloud based avionics services, applications, digital twins, and the FMS data lake, as discussed more particularly below. Device 140 be integrated with a connected aircraft platform and may be installed on commercial aircraft, and connected to read data acquisition unit (DAU) data. Device 140 may be in communication with the associated vehicle by either a wired connection or a wireless connection.

The EFB 110 may be a computer device carried by a pilot or a flight crew. The EFB 110 may store, for example, navigational charts, maps for air and ground operations of an aircraft, a flight plan management system, an aircraft operating manual, flight-crew operating manual, software applications which automate flight-related or avionics-related computation tasks, and/or any application or data which may be installed in a general purpose computing platform. The on-board FMS 108 may be any specialized computer system physically installed in an aircraft (e.g., the cockpit). The on-board FMS 108 may be programmed and/or customized to service the flight crew of the aircraft with in-flight tasks. The dispatcher device 130 may be any computer device which may be accessed by a user who performs planning, flying, navigating, or managing tasks associated with aircrafts, airspaces, airports, or flight plans. Accordingly, the user is not limited to a dispatcher, and the dispatcher device 130 is not limited to a device of a dispatcher. The connected FMS cloud services platform 114 may be a cloud-based platform. The connected FMS cloud services platform 114 may provide FMS services, including but not limited to responding to push/pull requests, sync requests, and processing of any other requests to any user who has authorized access to the platform, as described in further detail below.

The environment 100 may accommodate access by various types of users. For example, a pilot in cockpit 102 may have access to the EFB 110, EFB applications 112 installed in an EFB 110, and/or the on-board FMS 108 for accessing the connected FMS cloud services platform 114 via device 140. Because of the fundamental avionic functions continually provided by the on-board FMS 108 during a flight, a pilot in cockpit 102 may use on-board FMS 108 as the sole or primary avionic system for performing in-flight tasks and operations 118. Additionally, the pilot in cockpit 102 may also use the EFB 110 within the cockpit (e.g., on a tablet or any other portable computing device), as a back-up FMS access device and/or a supplemental avionic device. The EFB applications 112 may access the connected FMS cloud service platform 114, and provide the FMS services to the users of the EFB 110 in which the EFB applications are installed. In that way, the EFB 110 may provide user-friendly and customized user interfaces, by which FMS services from device 140 via the platform 114 may be serviced, for example, to the pilot in cockpit 102.

The on-board FMS 108 may also be configured to push and/or pull data 122 with connected device 140 on the ground and/or during operations (e.g., in the air during flight) as well as push/pull data 123, via device 140, with connected FMS cloud services platform 114. In some aspects, pushing and/or pulling data 122, 123 can be performed using an application programming interface (API). In addition, the on-board FMS 108 may also be configured to synchronize data 120 (e.g., synchronize data transmitted as to current flight operations and/or future flight operations) between the on-board FMS 108 while in the air, via device 140, with EFB applications 112. Thus, in some implementations, the on-board FMS 108 may be synchronized with data from EFB 110, device 140, and the platform 114 in real-time, at predetermined intervals, or as desired (e.g., manually initiating data pushing or pulling from device 140 and/or platform 114) in such a way that the pilot in cockpit 102 may rely on the on-board FMS 108 for all tasks arising in the environment 100.

A pilot on ground 104 may also access the EFB 110 and the EFB applications 112. In some implementations, the pilot on ground 104 and the pilot on cockpit 102 may be the same pilot, yet under different circumstances (e.g., time and location of the access). Additionally, or alternatively, the pilot on ground 104 may be a different pilot, or another authorized member of the flight crew, who accesses EFB 110 on the ground for an official duty related to the connected FMS cloud services 114 and/or device 140. In some aspects, while the pilot on ground 104 is accessing the EFB applications 112 via EFB 110, the EFB applications 112 may access the connected FMS cloud service platform 114 and/or device 140, and receive various FMS services from only one or both. In that way, the EFB 110 may provide user-friendly and customized user interfaces, by which FMS services 126 from the connected FMS cloud service platform 114 and/or device 140 may be serviced to the pilot on ground 104.

A dispatcher 106 may also access the connected FMS cloud services platform 114, as well as device 140 via platform 114, through a dispatcher device 130. A dispatcher, in accordance with the present disclosure, may be any authorized personnel performing duties related to dispatching of aircrafts in the environment 100. For example, a dispatcher may be an airline staff, an airport staff, air traffic control personnel, a ground control personnel, a member of a relevant aviation authority, or any other authorized person who may benefit from FMS services from the connected FMS cloud services platform 114 in performing his/her duties. A dispatcher device 130 may be any computing device capable of establishing a connection 128 to the cloud and interfacing with the connected FMS cloud services platform 114. While a dispatcher 106 is accessing the FMS services via the dispatcher device 130, the dispatcher device 130 may access the connected FMS cloud service platform 114, and receive various FMS services from it. In that way, the dispatcher device 130 may provide user-friendly and customized user interfaces, by which FMS services 128 from the connected FMS cloud service platform 114 may be serviced to the dispatcher 106.

The on-board FMS 108, the EFB 110, the FMS device 140, and the dispatcher device 130 may include one or more devices capable of receiving, generating, storing, processing, and/or providing information associated with FMS services. For example, the on-board FMS 108, the EFB 110, the FMS device 140, or the dispatcher device 130 may include a communication and/or computing device, such as a mobile phone (e.g., a smart phone, a radiotelephone, etc.), a computer (e.g., a desktop computer, a laptop computer, a tablet computer, a handheld computer), a gaming device, a wearable communication device (e.g., a smart wristwatch, a pair of smart eyeglasses, etc.), or a similar type of device.

As indicated above, FIG. 1 is provided merely as an example. Other examples are possible and may differ from what was described with regard to FIG. 1, including but not limited to the example environments discussed below. The number and arrangement of devices and networks shown in FIG. 1 are provided as an example. In practice, there may be additional devices, fewer devices and/or networks, different devices and/or networks, or differently arranged devices and/or networks than those shown in FIG. 1. Furthermore, two or more devices shown in FIG. 1 (e.g., EFB 110 and dispatcher device 130) may be implemented within a single device, or a single device shown in FIG. 1 (e.g., EFB 110, on-board FMS 108, device 140, or dispatcher device 130) may be implemented as multiple, distributed devices. Additionally, or alternatively, a set of devices (e.g., one or more devices) of environment 100 may perform one or more functions described as being performed by another set of devices of environment 100.

FMS cloud services platform 114 can be connected to an example computing environment 200. One example of environment 200 is shown more clearly in FIG. 2, which illustrates a block diagram schematically showing an example environment 200. Environment 200 may be an example of a FMS platform that receives system requests related to one or more operation parameters (e.g., flight identification entry, or specific pilot request for data update, etc), processes the requests, and transmits notifications and/or other responses based on the processed requests.

Figure 2:
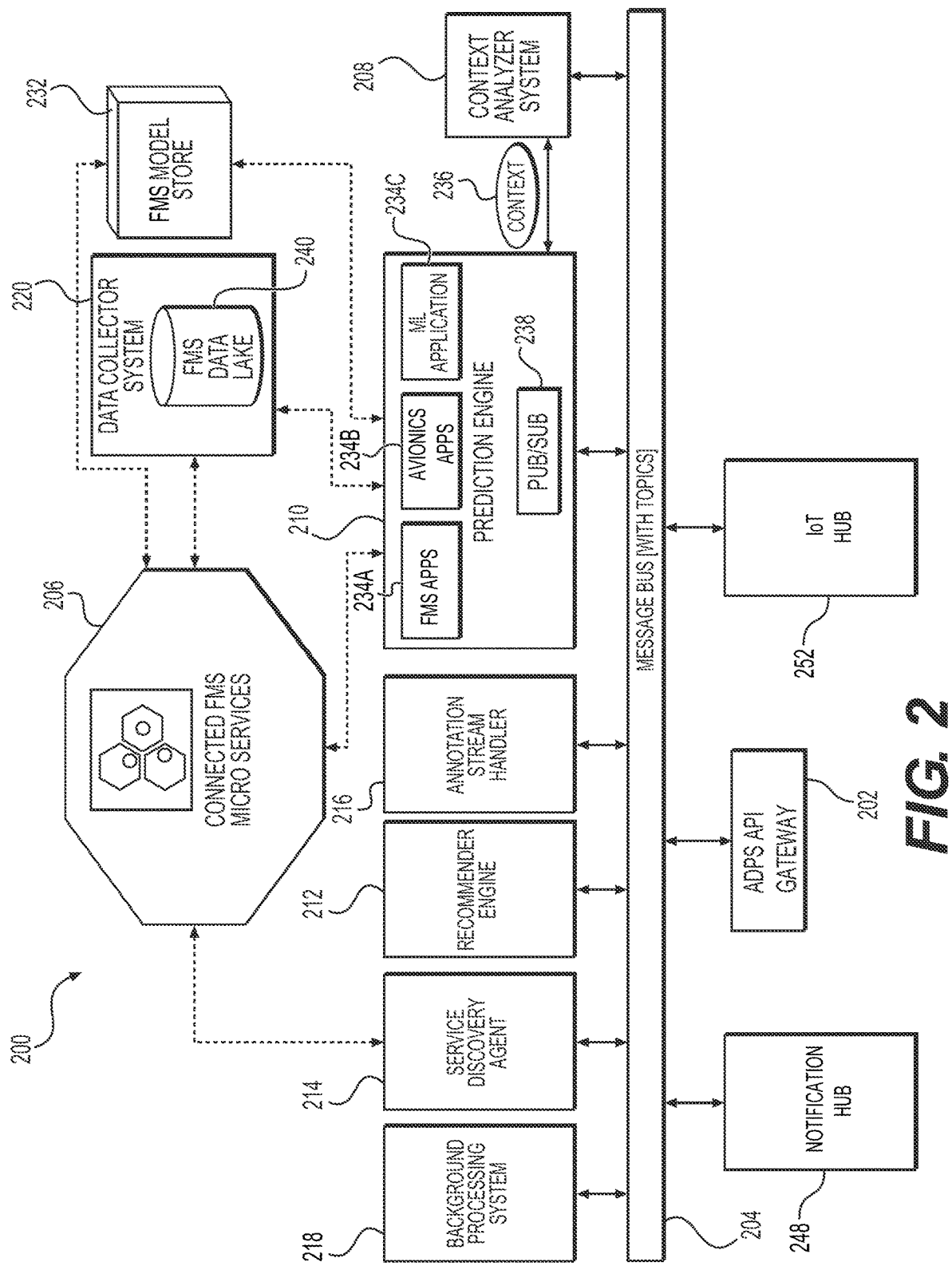
FIG. 2 depicts a block diagram schematically showing a connected FMS cloud services platform, according to one or more embodiments.

As shown in FIG. 2, the environment 200 may include a message bus 204, servicing modules 208-220, connected FMS micro-services 206, a notification hub 248, and/or an IoT hub 252. In some implementations, the environment 200 may couple with or otherwise correspond to the connected FMS cloud services platform 114, allowing for or otherwise interfacing with communications 122, 123, 124, and 128 depicted in FIG. 1. Components, devices, and modules of environment 200 may interconnect via wired connections, wireless connections, or a combination of wired and wireless connections.

Environment 200 may include an avionics data processing service (ADPS) API gateway 202 which can serve as a point of entry between environment 100 and environment 200, as described more particularly below. For example, gateway 202 may serve as a point of entry for a group of micro-services, such as the connected FMS micro-services 206, notification hub 248, and IoT hub 252. Depending upon various use cases, the ADPS gateway 202 may be configured to accommodate requests or communications (e.g., requests from on-board FMS 108, EFB applications 112, EFB device 140, and/or dispatcher device 130), invoke multiple back-end services (e.g., services by connected FMS micro-services 206) and aggregate and/or coordinate the results. The ADPS gateway 202 may be in communication with the message bus 204, in order to communicate with the various back-end services. In addition, the ADPS gateway 202 may be, for example, configured to be updated each time a new micro-service is added or removed in the connected FMS micro-services 206. The ADPS gateway 202 may be implemented as hardware, software, and/or a combination of hardware and software.

The message bus 204 may be a connecting middleware between servicing modules 202-220, which enable the servicing modules 202-220 to interconnect and communicate amongst each other using messaging. The message bus 204 may include a messaging infrastructure, where each servicing module, for example, may provide data and allow other servicing modules to use them according to the modules' specific use cases. The message bus 204 may support, for example, single request/reply communications, group request/reply communications, and broadcast functions. In some implementations, servicing modules may provide data onto the message bus without mandating how the data are to be used, thereby resulting in free flow of data which allows various servicing modules to non-destructively consume and/or utilize those messages. The ADPS gateway 202 may be implemented as hardware, software, and/or a combination of hardware and software.

The connected FMS micro-services 206 may be FMS services organized as a collection of specialized modular services. In some implementations, the connected FMS micro-services 206 may be software applications stored, at least in part, in one or more servers remote from on-board FMS 108, EFB 110, EFB device 140, and dispatcher device 130, for cloud-based access from at least one of these devices. The connected FMS micro-services 206 may be modular services which are developed, deployed, and scaled independently of each other, messaging-enabled to communicate with various components within the environment 200, and organized around capabilities. The connected FMS micro-services 206 may include, for example, flight planning services, in-flight navigation services, airport specific services, ground communication services, weather services, services for computing fuel scenarios, services for computing optimization scenarios, services for offsetting deviations, and services for computing approach procedures. The connected FMS micro-services 206 may be implemented as hardware, software, and/or a combination of hardware and software.

The services associated with FMS micro-services 206 may be accessed by one or more FMS cloud APIs. Specifically, the ADPS gateway 202 may receive requests from a user device, in accordance with the one or more FMS cloud APIs, and process the request by routing the API request to a service. FMS micro-services 206 may process the request and transmits a response to the ADPS gateway 202. The ADPS gateway 202 may transmit the response to the user device.

A context analyzer system 208 may be a servicing module included in the environment 200. The context analyzer system 208 may receive one or more context analysis parameters, use the parameters to determine contexts, and provide one or more contexts to the message bus and/or the prediction engine 210. Subsequently, the one or more determined contexts may be used at any other component connected to the context analyzer system 208 in the environment 200. The one or more contexts may be, for example, a flight context, an airport context, or a weather context, and the contexts may be determined from communicating with a cockpit, a ground system, an airport database system, and/or connected weather services. By determining contexts, the accuracy and efficiency of services provided by the environment 200 may be enhanced by adding intelligence to the ways that the services deliver results. For example, determining pending flight information and airport status information as contextual data may enable the prediction engine 210 to more accurately and dynamically predict which flight plan requests would be received in the next few hours. The contextual data provided by the context analyzer system 208 may be used for various use cases in the environment 200, as described in further detail below. The context analyzer system 208 may be implemented as hardware, software, and/or a combination of hardware and software.

A prediction engine 210 may be another servicing module included in the environment 200. The prediction engine may be in connection with the message bus, as well as with the connected FMS micro-services 206, FMS data lake 240, FMS model store 232, and/or the context analyzer system 208. The prediction engine 210 may predict FMS services which are required for specific contexts, or predict data which may be necessary for an FMS service(s) or an operation of another servicing module(s). Predictions provided by the prediction engine 210 may be used for various use cases in the environment 200. The prediction engine 210 may be implemented as hardware, software, and/or a combination of hardware and software.

The prediction engine 210 may include one or more FMS applications 234A, one or more avionics applications 234B, and one or more machine learning applications 234C. While three applications (234A, 234B, and 234C) are depicted by way of example, the prediction engine 210 may be configured to include any number of one or more applications based, including additional machine learning applications, on predetermined preferences. In some implementations, output(s) from one or more of the included applications may become input(s) for different one or more of the machine learning applications to arrive at inference or prediction results. Additionally, one or more of the included machine learning applications may, for example, have streaming analytics capability along with down sampling of data.

The prediction engine 210 may, for example, use the applications 234A-234C trained on a training set (e.g., FMS micro-services that have been called under certain contexts) in order to analyze the FMS micro-services being validated against certain operation parameters (e.g., a request validated against a current flight mission), processed by a respective avionics data access port mechanism (e.g., mechanism 385a-385n described below) for insertion of data into FMS 108 (e.g., a current plan, a performance factor update, etc.) and/or to retrieve data from FMS 108 (e.g., a flight summary, an aircraft state, a trajectory, etc.), and/or send to nodes in the FMS cloud services platform 114. In some implementations, the prediction engine 210 may analyze prior predictions, to the extent obtainable from environment 200 and/or other environments, to train the applications 234A-234C (e.g., using one or more big data techniques) and determine predictions of FMS services which are required for specific contexts, or data predicted to be necessary.

The FMS model store 232 may be a repository that may store pre-built machine learning models, each with its respective model index. The repository may be, for example, a centralized, cloud-based data repository. A model index may include, for example, information related to the purpose of the model, training data set, and the accuracy of the machine learning model. The prediction engine 210 may utilize one or more models from the FMS model store 232 based upon runtime needs. In addition, the prediction engine may include PUB/SUB component 238, which may be publisher/subscriber component that may operate on the message bus 204. In some implementations, the prediction engine 210 may use PUB/SUB 238 component to receive notifications from the message bus 204 by subscribing to certain event topics, and/or publish messages onto the message bus 204 to notify other peer applications.

A recommender engine 212 may be another servicing module included in the environment 200. The recommender engine 212 may be configured to determine one or more recommendations associated with the one or more FMS services, based on one or more recommendation requests, the one or more contexts, and/or the prediction data. The recommendation requests may be received from on-board FMS 108, EFB applications 112, FMS device 140, and/or dispatcher device 130. Additionally, or alternatively, the recommendation requests may be received from any other servicing modules in the environment 200 or any of the connected micro-services 206. The determined recommendations may be, for example, different flight plans based on conditions relating to weather, traffic, and/or terrain, or one or more aircraft performance options (e.g., cost index calculations for an aircraft) based on one or more predicted scenarios (e.g., data predicted at the prediction engine 210). The recommender engine 212 may be implemented as hardware, software, and/or a combination of hardware and software.

A background processing system 218 may be a servicing module included in the environment 200. In some implementations, a service discovery agent 214 and annotation stream handler 216 may be modules controlled by the background processing system 218, and/or sub-modules included in the background processing system 218. For example, a service discovery agent 214 may identity the most appropriate available micro-service which may be dynamically required for the avionics application needs, and bind an application connection request to the identified micro-service. An annotation stream handler 216 may, for example, help the connected FMS cloud services modules 208-220 and the FMS micro-services 206 to refine the telemetry data from industrial internet of things (IIoT) cloud communication channel(s) (e.g., IIoT hub 252).

In implementations where the service discovery agent 214 and the annotation stream handler 216 are included in the background processing system 218, the modules service discovery agent 214, annotation stream handler 216, and background processing system 218 may be collectively referred to as the background processing system 218. In some other implementations, the service discovery agent 214 and annotation stream handler 216 may be in communication with the background processing system 218, as separate modules in the environment 200. The service discovery agent 214 may discover one or more service(s) (e.g., FMS micro-services) to identify, for example, the discovered one or more service(s) as a scheduled service(s) that the background processing system 218 to prepare background support data for. The annotation stream handler 216 may, for example, create and manage annotations of data streams which are received and/or produced by the background processing system 218. For example, to coordinate delivery of large volume of data (e.g., background support data being delivered to data collector system 220), the annotation stream handler 216 may provide semantic annotation of streaming data to support dynamic integration of the prepared data into the predicted FMS micro-service(s).

The background processing system 218 may be configured to identify one or more background operations to support an operation of a first FMS service, and generate background support data for the first FMS service using the one or more background operations. The first FMS service may be, for example, a FMS micro-service, among the connected FMS micro-services 206, which is predicted by the prediction engine 210 as the FMS micro-service that may be required to run at a certain time based on a given context. As another example, the first FMS service may be a set of one or more micro-services, which may be scheduled to run in a particular time frame in the future. Once the first FMS service is identified, the background processing system 218 may identify one or more background operations to generate support data for the first FMS service. The background operations may be one or more FMS micro-services from the connected FMS micro-services 206, one or more software services from a source other than the connected FMS micro-services 206, or a combination thereof. The background processing system 218 may execute the background operations to prepare data for the first FMS service. Such background operations may be selected and executed under various use cases in the environment 200. The background processing system 218 may be implemented as hardware, software, and/or a combination of hardware and software.

A data collector system 220 may be a servicing module included in the environment 200. In some implementations, a data collector system 220 may include and/or control databases such as FMS data lake 240, as shown in FIG. 2. In some other implementations, a data collector system 220 may include and/or control one or more databases, without including and/or controlling the FMS data lake 240. In implementations where FMS data lake 240 is not included in the data collector system 220, the FMS data lake may be a separate database which is in communication with at least one of the message bus 204, a module among service modules 208-220, and the connected FMS micro-services 206.

The data collector system 220 may receive or generate data associated with one or more of the servicing modules (e.g., the context analyzer system 208, the recommender engine 212, the prediction engine 210, the background processing system 218, and the data collector system 220). The data collector system 220 may also store the usable data in a data repository (e.g., FMS data lake 240 or another database) for later use or retrieval by at least one of the servicing modules. In some implementations, the data collector system 220 may provide data repository (e.g., FMS data lake 240 or another database) where all raw data in their native format until the data are needed. In this way, the data may be stored in a flat architecture, with each data element tagged with a set of metadata. The data collector system 220 may be used for various use cases in the environment 200. The data collector system 220 may be implemented as hardware, software, and/or a combination of hardware and software.

The notification hub 248 may interact with users via multi-model channels, process one or more requests related to operations of the aircraft and/or related user, and transmit notifications (e.g., send request status notification such as acknowledgment of flight plan download completing, notification that the data can be removed from FMS cloud services platform 114 or FMS device 140 if no longer required), as discussed in more detail below.

IoT hub 252 may include an edge layer with one or more sensors, actuators, or other devices, controllers, gateways, and the like. IoT hub 252 may include one or more modules for data and security communications, analytics, reporting, and planning. In certain aspects, IoT hub 252 can control data being collected, modeled, and processed, and how knowledge is extracted from the collected data in environment 200.

The number and arrangement of modules, devices, and networks shown in FIG. 2 are provided as an example. In practice, there may be additional modules and devices, fewer modules, devices and/or networks, different modules, devices and/or networks, or differently arranged modules, devices and/or networks than those shown in FIG. 2. Furthermore, two or more devices included in environment 200 of FIG. 2 may be implemented within a single device, or a single device in the environment 200 of FIG. 2 may be implemented as multiple, distributed devices. Additionally, or alternatively, a set of devices (e.g., one or more devices) of environment 200 may perform one or more functions described as being performed by another set of devices of environment 200. Each servicing module (e.g., the context analyzer system 208, the recommender engine 212, the prediction engine 210, the background processing system 218, and the data collector system 220) may perform its functions using one or more computer processors, and in some implementations, each servicing module may comprise the one or more computer processors as a component therein.

Figure 3:
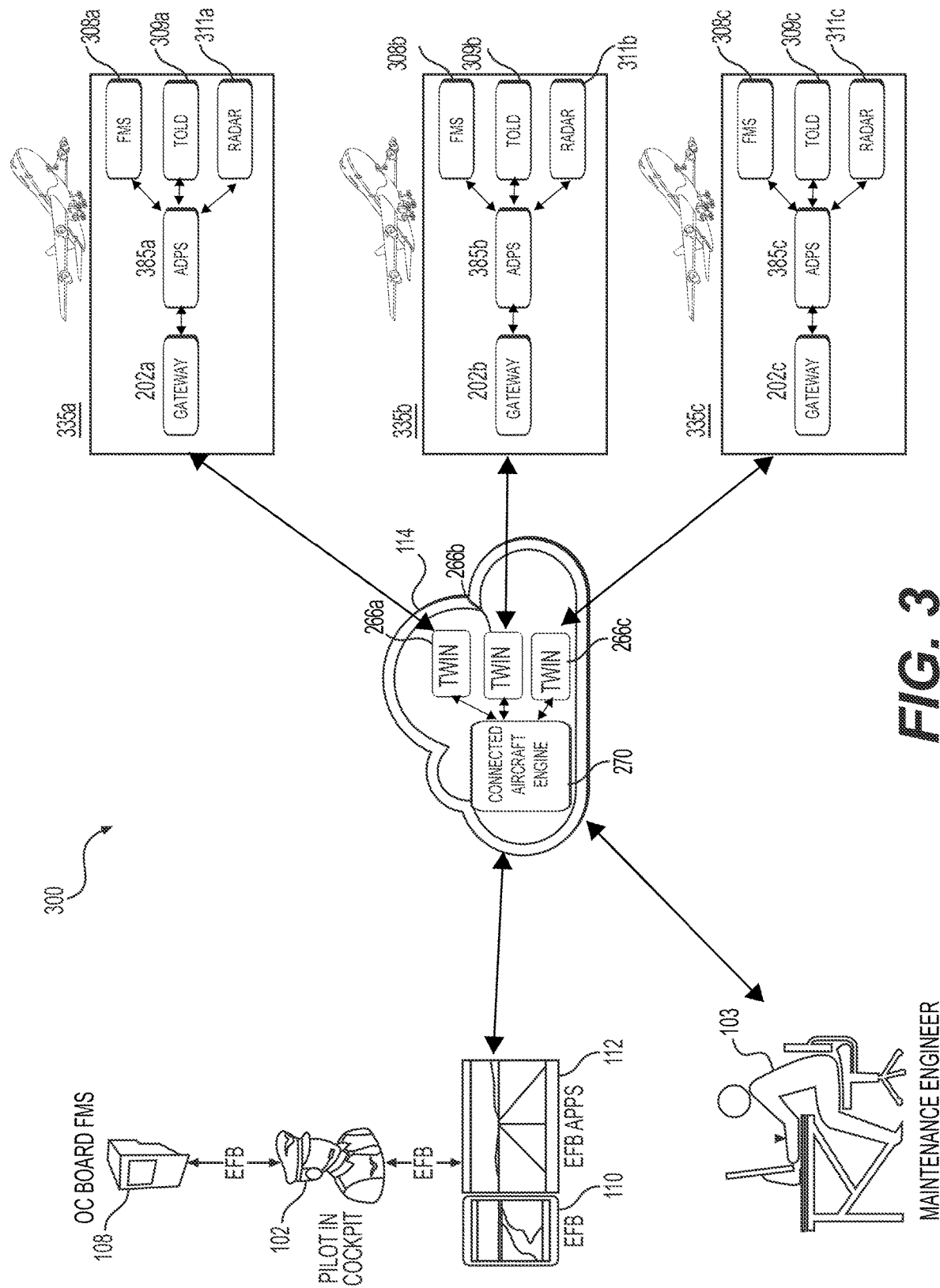
FIG. 3 depicts a system environment for bi-directional communication between one or more vehicles and a cloud computing system of FIG. 1, according to one or more embodiments.

FIG. 3 depicts a block diagram 300 of a system for a connected aircraft cockpit with connectivity capability to the FMS cloud services platform 114 through gateways 202a-202c (e.g., one gateway per aircraft in FIG. 3 same or similar to previously discussed gateway 202 of environment 200). As shown, the FMS cloud services platform 114 can be organized in certain aspects based on the operator fleet with one repository (e.g., digital twin 266a-266c) for every vehicle in the fleet. In some aspects, a connected aircraft engine model 270 can be provided with FMS cloud services platform 114 to process one or more requests from a computing system remotely connected to FMS cloud services platform 114 (e.g., from a maintenance engineer 103, pilot in cockpit 102, etc.) in connection with digital twin 266a-266c and respective gateway 202a-202c via cloud services platform 114. For example, onboard and/or remote users (e.g., users on-board FMS 108 and/or offboard via EFB 110 and/or EFB applications 112) can be logged in to FMS cloud services platform 114 and initiate one or more requests that include data intended for the systems of at least one of aircraft 335a-335c or the fleet of aircraft 335a-335c. The connected aircraft engine model 270 can process (e.g., re-route) the one or more requests to the appropriate digital twins 266a-266c in a format recognizable by the ADPS 385a-385c of the computing systems of the aircraft 335a-335c as well as EFB 110 and EFB applications 112.

Nodes 266a-266c can be networked, provided in FMS cloud services platform 114 and correspond to a respective gateway 202a-202c (e.g., a corresponding aircraft in the fleet of aircraft). Each gateway 202a-202c can include one or more communication interfaces for communicating with FMS cloud services platform 114. The communication interfaces of gateways 202a-202c may include one or more cellular radios, Bluetooth, WiFi, near-field communication radios, Ethernet, or other appropriate communication devices for transmitting and receiving information. Multiple communication interfaces may be included in each gateway 202a-202c for providing multiple forms of communication between FMS cloud services platform 114 and systems of the aircraft 335a-335c, including but not limited to the gateways 202a-202c, ADPS 385a-385c and corresponding onboard FMS systems 308a-308c, takeoff-and-landing data systems (TOLD) 309a-309c (e.g., takeoff-and-landing data engine container and associated database), and onboard RADAR systems 311a-311c.

Gateways 202a-202c can include a processor and memory for storing and executing program instructions to facilitate data processing. Accordingly, gateways 202a-202c may include one or more software modules or components for providing data processing services and/or other services or methods of the present disclosure. For example, gateways 202a-202c can be configured to receive data from the ADPS 385a-385c, systems 308a-308c, systems 309a-309c, systems 311a-311c, and any other systems connected therewith and process the data prior to sending the data to FMS cloud services platform 114. It should be appreciated that other aircraft systems may be bridged by FMS cloud services platform 114 and gateway 202a-202c, including synthetic vision systems (SVS), ground proximity warning systems (GPWS), engine systems, wheel systems, brake systems, power systems, auxiliary power systems, and/or the like.

In some aspects, each ADPS 385a-385n can be a separate space and time partitioned component configured as an intelligent data transfer port that integrates insights from advanced data analytics without impacting aircraft operations and any related end-users (e.g., crew, pilots, ground personnel, etc.). In some aspects, the ADPS 385a-385c can act as a multi-mode data acquisition agent for one or more avionics onboard a respective aircraft and serve the one or more requests of this disclosure (e.g., one or more requests related to operation parameters, such as a request from one or more remote client applications). The ADPS 385a-385c can provide access to the data from onboard devices such as avionics (e.g., corresponding onboard FMS systems 308a-308c, takeoff-and-landing data systems (TOLD) 309a-309c, onboard RADAR systems 311a-311c, etc.) by transmitting the data to the respective application(s) in the required format and vice versa. Each ADPS 385a-385c can reside along with the avionics of interest (e.g., FMS 308a-308c) sharing the same processor and computing system.

In some aspects, bi-directional data transfer is executed via ADPS 385a-385c, the onboard FMS 308a-308c of each aircraft 335a-335c, and the outside world (e.g., computing system(s) connected to FMS cloud services platform 114 and used by one or more pilots on the ground 104, dispatchers 106, maintenance engineers 103 via FMS cloud services platform 114, etc.). In some examples, the ADPS 385a-385c can be configured to identify all the necessary data for a flight mission and retrieve the same for a respective aircraft 335a-335c.

For example and without limitation, during an initialization process of FMS 308a-308c of aircraft 335a-335c or on a trigger from FMS 308a-308c, such steps can initiate transmission of one or more requests related to one or more operation parameters (e.g., flight identification entry, specific pilot request for data update, one or more requests from the crew selecting an update option in FMS 308a-308c). In response to the one or more pending requests, the ADPS 385a-385c can connect to FMS cloud services platform 114 to look for relevant information (e.g., locate one or more available flight plans uploaded for a mission such as the current flight mission). In some aspects, the one or more requests can be received in FMS 308a-308c (e.g., on the day of a flight when the aircraft is powered on or on an update request sent from the crew) which can cause a respective gateway 202a-202c to connect to FMS cloud services platform 114 and search for data relevant to the one or more requests (e.g., a flight mission). Such one or more pending requests may be received by one or more of gateways 202a-202c, validated, and forwarded to a respective ADPS 385a-385c.

In some aspects, ADPS 385a-385c can validate the data associated with the update related to the one or more requests against one or more current flight operation parameters (e.g., one or more requests arising from the initialization process of FMS 308a-308c, the trigger from FMS 308a-308c, etc., compared against a current flight mission). Upon validating, ADPS 385a-385c can insert the updated flight operation parameters (e.g., updated flight plant) into FMS 308a-308c using data ingestion mechanisms of ADPS 385a-385c and ultimately sent to nodes 266a-266c in the FMS cloud services platform 114. In some aspects, one or more acknowledgement notifications can also be sent to FMS cloud services platform 114 and/or systems in bi-directional communication therewith (e.g., systems 308a-308c, on-board FMS 108, EFB 110, EFB applications 112, etc.) so status of one or more pending requests can be readily known by logged in users.

In addition to updating one or more flight operation parameters, the ADPS 385a-385c can be used to selectively retrieve (e.g., look for and retrieve in an optimized, efficient, and/or otherwise appropriate order) one or more discrete entries from one or more databases of or connected to FMS cloud services platform 114, such as a cost index for a flight mission, a performance factor, etc. The ADPS 385a-385c can insert the retrieved one or more discrete entries into the FMS 308a-308c. The ADPS 385a-385c can also be extended to automatically upload one or more current vehicle operations data, such as flight information, an aircraft state, flight trajectory data, BITE data, etc., to the corresponding repository (e.g., digital twin 266a-266c) for access to ground or other in-air applications.

While the exemplary embodiment of FIG. 3 depicts three aircraft 335a-335c each having a single gateway 202a-202c, a single ADPS 385a-385c, a single FMS 308a-308c, a single TOLD 309a-309c, and a single radar 311a-311c, it is understood that the system of the present disclosure may include any number of aircraft 335a-335c each having any number of components. Further, it is understood that the systems of the present disclosure may include any number of nodes 266a-266c.

Figure 4A:
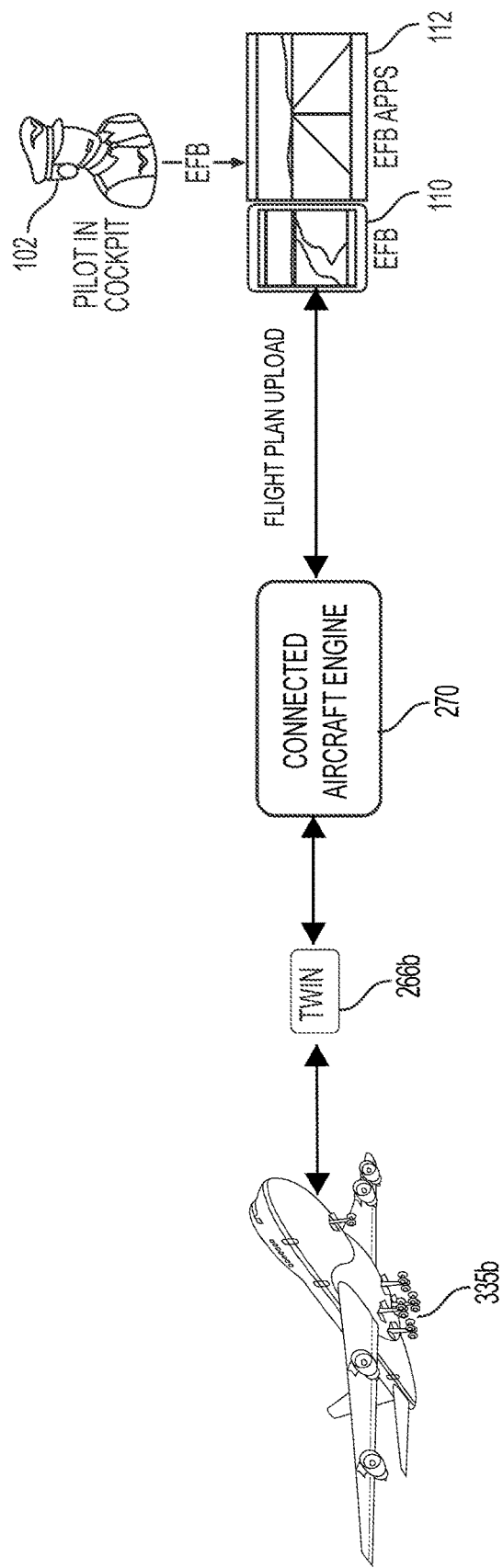
FIG. 4A depicts an exemplary flow diagram for bi-directional communication between one or more vehicles and a cloud computing system of FIGS. 1 and/or 3, according to one or more embodiments.

FIG. 4A shows one aspect of flight information being bi-directionally downloaded and/or uploaded between EFB 110, EFB applications 112, and/or the pilot in the cockpit 102 with a repository (e.g., respective node 266b of FMS cloud services platform 114, as well as connected aircraft engine model 270). In the example of FIG. 4A, the respective node 266b of FMS cloud services platform 114 is in bi-directional communication with computing system of aircraft 335b (e.g., gateway 202b, ADPS 385b, systems 308b, systems 309b, systems 311b, etc.), whereby EFB 110 can be onboard aircraft 335b and/or EFB 110 can be elsewhere but in bi-directional communication with FMS cloud services platform 114.

Figure 4B:
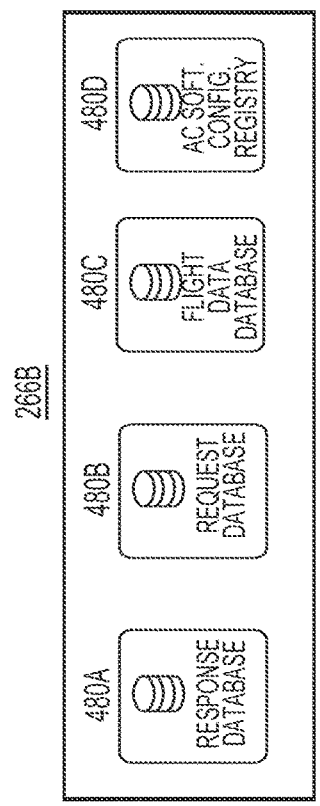
FIG. 4B depicts an exemplary onboard computing system of the type depicted in FIGS. 3-4A, according to an exemplary embodiment.

FIG. 4B shows an example node 266b of FIG. 4A. In some aspects, nodes 266a-266c can include one or more databases with specific software application programs, configurations, and dependencies, such as response database 480A, request database 480B, flight data database 480C, aircraft information software registry database 480D, each of which can be hosted on one or more servers of the connected FMS cloud services platform 114. In some aspects, response database 480A can store responses from a respective aircraft, a fleet of aircraft, or any other flight management system of an aircraft with connectivity to FMS cloud services platform 114 and coordinate one or more notifications to related to the data to the respective logged-in user as to status of the pending one or more request. In some aspects, request database 480B can store one or more request commands sent by user to respective aircraft. In some aspects, flight data database 480C can store data (e.g., fight data such as flight summary, flight plan, trajectory, event response data, etc.). In some aspects, aircraft information software registry database 480D include a registry with the aircraft identity and version of software and any corresponding databases.

Figure 5:
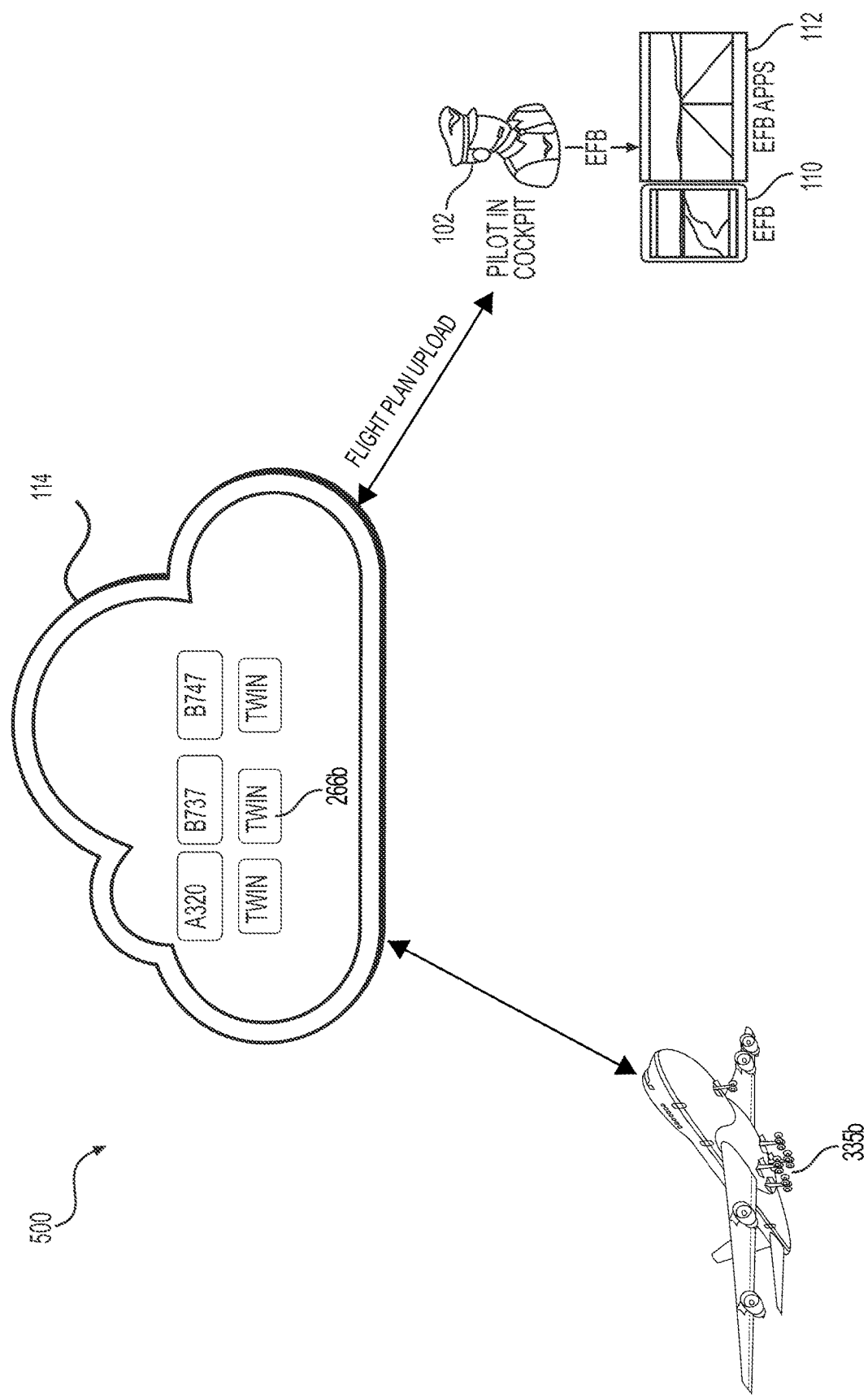
FIG. 5 depicts an exemplary flow diagram for bi-directional communication between one or more vehicles and a cloud computing system of FIGS. 1 and 3, according to one or more embodiments.

FIG. 5 depicts an exemplary flow diagram 500 for bi-directional communication between one or more vehicles and FMS cloud services platform 114 of FIGS. 1 and 3, according to one or more embodiments. In particular, systems of aircraft 335b are shown in FIG. 5 in bi-directional communication with FMS cloud services platform 114. Systems of EFB 110, EFB applications 112, and/or the pilot in the cockpit 102 are similarly shown in bi-directional communication with FMS cloud services platform 114. In depicted example, pilot in the cockpit 102 can be a logged-in user and transmit one or more requests (e.g., send a flight plan generated offline using flight planning tools) to node 266b associated with aircraft 335b via FMS cloud services platform 114. In this instance, aircraft 335b can be the aircraft the pilot plans to fly at a future scheduled event (e.g., the next day). When the future scheduled event occurs and one or more requests are initiated (e.g., when the aircraft is powered on or on an update request is initiated from the crew), initialization routines of the respective ADPS 385b connect to FMS cloud services platform 114 and look for information relevant to the flight mission (e.g., overlap with one or more flight mission descriptors such as time, date, weather, origin city, destination city, altitude, flight velocity, etc.) to compare, validate and/or incorporate with one or more operation parameters generated by the pilot previously (e.g., offline in a hotel room and saved locally but transmitted to FMS cloud services platform 114) using flight planning tools.

If the flight plan information is determined to be relevant and thus intended for the flight, the flight plan information is retrieved from the request queue of respective node 266*b* along with the requested flight plan data. The respective ADPS 385*b* then validates the one or more operation parameters against the flight plan to ensure that the operational parameters correspond to the flight plan of the aircraft 335*b*. Upon validation, the respective ADPS 385*b* matches the operational parameters with the flight mission (e.g., origin, destination, date and time of departure, etc.) and inserts the operational parameters into the flight plan thereby creating a modified flight plan in the FMS systems 308*b*. The aircraft 335*b* can then be controlled based on the modified flight plan. The respective ADPS 385*b* can also send an acknowledgment of download to inform users of the status of the pending request. The respective ADPS 385*b* can also initiate one or more requests to remove related flight operations data from the FMS cloud services platform 114 upon determining that the related flight operations data is no longer required. The pilot in the cockpit of aircraft 335*b* can then review the flight plan data and activate the same for use in the flight.

The ADPS 385*a*-385*c* is particularly advantageous for enabling remote upload and download capabilities to FMS 308*a*-308*c* of corresponding one or more aircraft 335*a*-335*c* with respect to computing system connected to FMS cloud services platform 114 and used by one or more pilots on the ground 104, dispatchers 106, maintenance engineers 103, and/or the like. As a result of these remote capabilities, the likelihood of data loss previously known to exist in control and/or updating flight operations can be minimized and/or eliminated, pilot workload can be reduced, and human data entry errors minimized and/or eliminated. Moreover, previous hardware limitations with respect to on-board data storage are resolved by the herein described timely transfer of flight operation data to FMS cloud services platform 114 and/or computing systems connected therewith.

Figure 6:
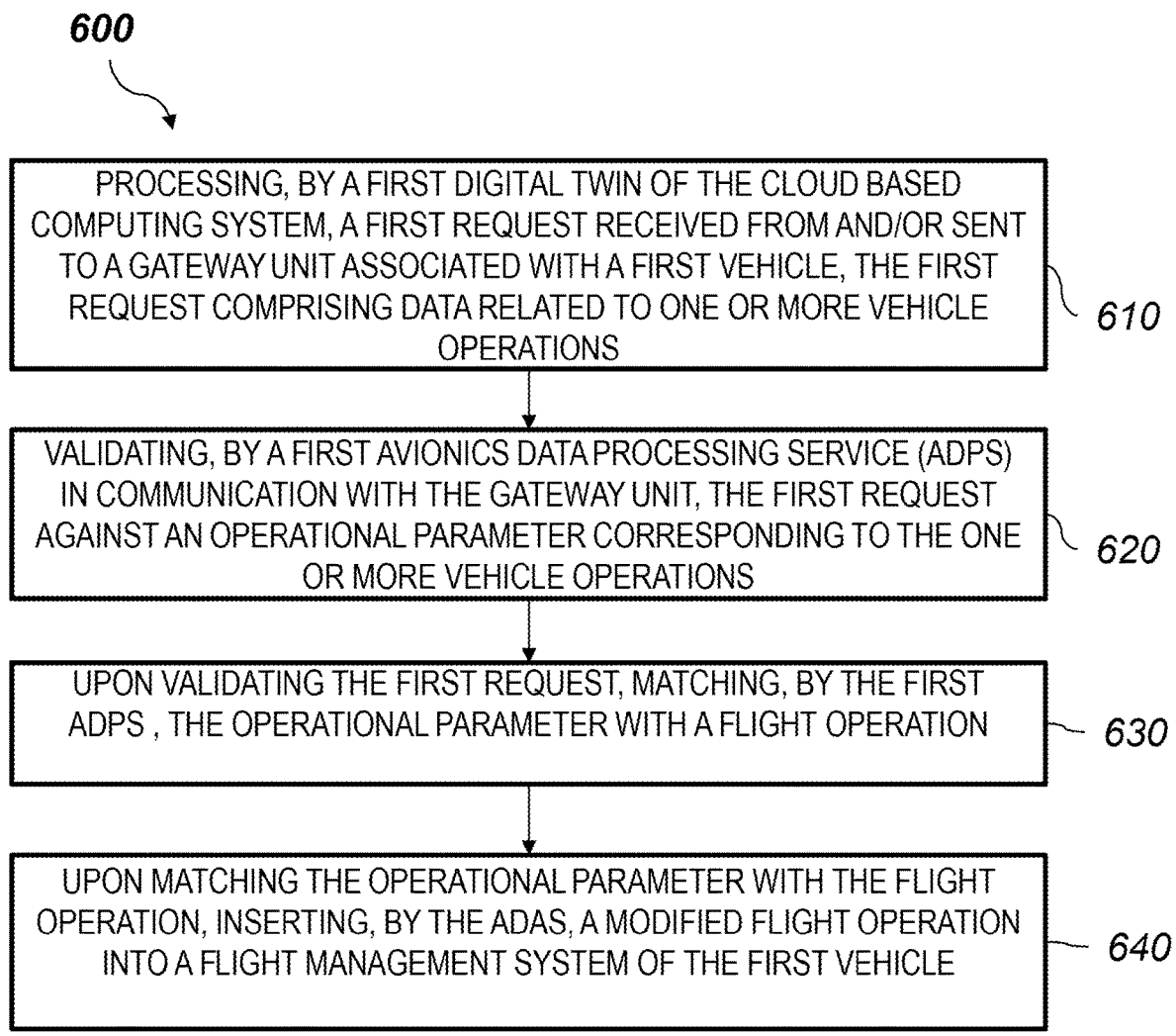
FIG. 6 depicts a flowchart for a method for bi-directional communication between one or more vehicles and a cloud based computing system according to an exemplary embodiment.

FIG. 6 depicts an exemplary method 600 for bi-directional communication between one or more vehicles (e.g., aircraft 335*a*-335*n*) and a remote system, such as a cloud computing system (e.g., FMS cloud services platform 114) according to an exemplary embodiment. According to one embodiment, the method 600 includes one or more of the following steps. In step 610, the method includes processing, by a first digital twin of the cloud based computing system, a first request received from and/or sent to a gateway unit associated with a first vehicle, the first request comprising data related to one or more vehicle operations. In step 620, the method includes validating, by an avionics data processing service (ADPS) in communication with the gateway unit, the first request against an operational parameter corresponding to the one or more vehicle operations. In step 630 the method includes upon validating the first request, matching, by the ADPS, the operational parameter with a flight operation. In step 640, the method includes upon matching the operational parameter with the flight operation, inserting, by the ADPS, a modified flight operation into a flight management system of the first vehicle.

The method 600 can include additional vehicles and corresponding ADPSs. In this respect, the method 600 can include transmitting, by the ADPS of any vehicle in a fleet, an acknowledgment notification to a respective digital twin that the operational parameter has been matched and/or the respective modified flight operation inserted into the flight management system of the respective vehicle.

Additionally, the method 600 can include upon determining that the modified flight operation has been accessed and/or activated by the flight management system of the vehicle, removing the modified flight operation, by the ADPS, from the cloud based computing system.

In some aspects, the ADPS(s) of the method 600 can be resident to a computing system of the vehicle or resident to a computing system in remote communication with the vehicle via the cloud based computing system.

Additionally, the method 600 can include transmitting, by the ADPS, the data including the one or more requests during an initialization process of the flight management system of the vehicle or on a trigger from the flight management system or a computing system remotely connected therewith via the cloud based computing system.

In some aspects, the method 600 can include identifying, by the ADPS, data for a predetermined vehicle operation and selectively retrieving (e.g., look for and retrieve in an optimized, efficient, and/or otherwise appropriate order) predetermined vehicle operation data from one or more databases of the cloud based computer system to execute or otherwise cause the vehicle to perform the predetermined vehicle operation.

In some aspects, the method 600 can include causing, by the ADPS, the one or more requests to be received by the flight management system during or just prior to the flight operation so that a gateway communication interface of the vehicle connects to the cloud based computing system and searches for data relevant to the one or more requests.

In some aspects, the method 600 can include automatically transmitting, by the ADPS, one or more current vehicle operations data to at least one digital twin of the cloud based computing system rendering accessible the one or more current vehicle operations data by one or more computing systems in communication with the cloud based computing system.

Figure 7:
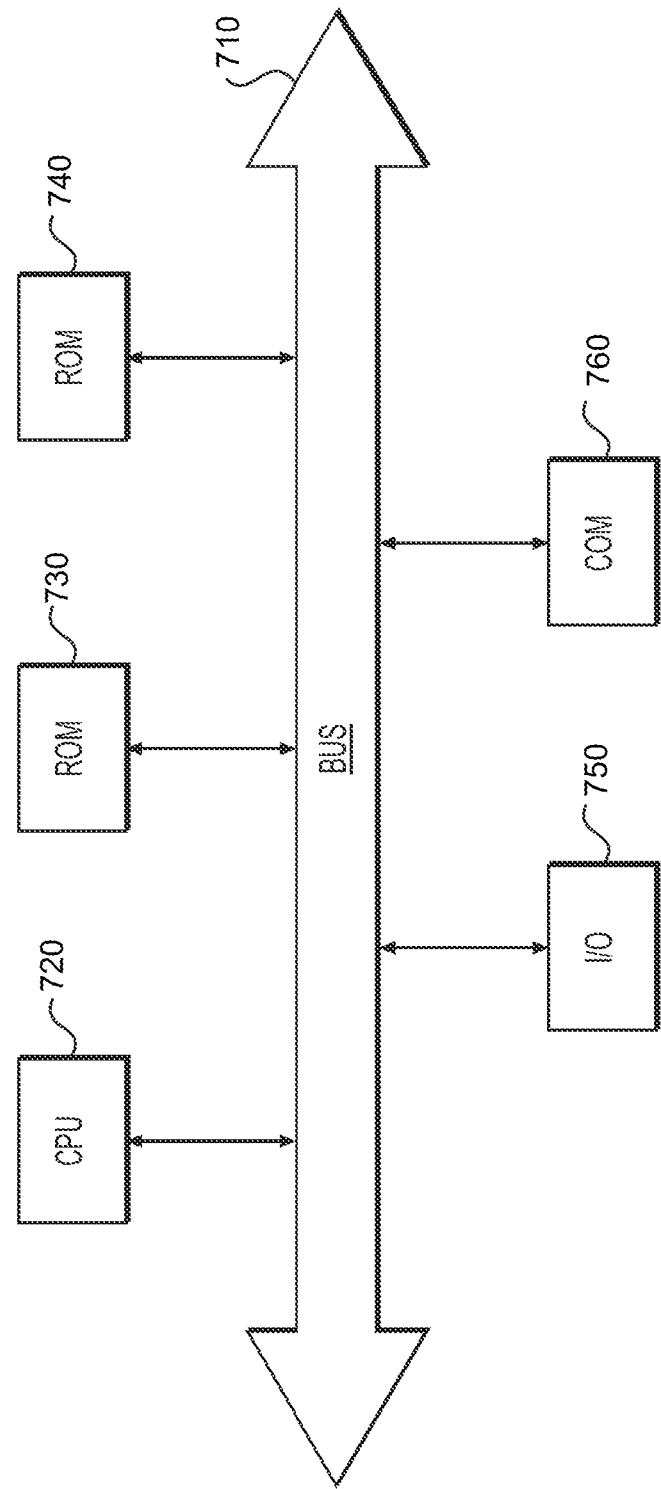
FIG. 7 depicts an example system that may execute techniques presented herein.

FIG. 7 depicts an example system that may execute techniques presented herein. FIG. 7 is a simplified functional block diagram of a computer that may be configured to execute techniques described herein, according to exemplary embodiments of the present disclosure. Specifically, the computer (or "platform" as it may not be a single physical computer infrastructure) may include a data communication interface 760 for packet data communication. The platform may also include a central processing unit ("CPU") 720, in the form of one or more processors, for executing program instructions. The platform may include an internal communication bus 710, and the platform may also include a program storage and/or a data storage for various data files to be processed and/or communicated by the platform such as ROM 730 and RAM 740, although the system 700 may receive programming and data via network communications. The system 700 also may include input and output ports 750 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The herein disclosed system and related methods are advantageous for providing a system that allows for remote data transmission while minimizing and/or eliminating data losses due to connection dropping, pilot workload can be reduced, data entry errors can be minimized and/or eliminated, on-board data storage limitations can be overcome by timely remote transfer of data, and users and/or applications can establish data protocol(s) rather using industry standard protocol(s)

In so doing, the herein disclosed system and related methods can advantageously increase the efficiency of vehicle operations by providing a secure and reliable bi-directional data transfer mechanism that does not require personnel to monitor or handle data exchange. Further, remote applications can exchange data between the ground and vehicle without manual intervention and support advanced data analytics. The various personnel (e.g., crew, maintenance, operations, etc.) can work seamlessly without having to wait for required information and/or data. The system and/or related method also enables remote data broadcast which provides for remote and/or local access to information instantly and reduce the workload on locally and/or remotely.

The herein disclosed system and related method also is advantageous for enabling data communication that includes flight data (e.g., flight plan, performance initialization data such as cruise altitude, fuel on board, cost index, etc.), upload and/or download, flight software configuration, and/or database updates. The herein disclosed system and related method also is advantageous for downloading of aircraft data (Flight summary, Byte dumps) remotely without manual intervention in the cockpit. The herein disclosed system and related method is also advantageous as it enhances the ADPS to an intelligent data transfer port enabling operators to integrate insights from advanced data analytics faster and with little to no impact to flight operations and workload of flight operations personnel.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A non-transitory computer-readable medium storing instructions that, when executed by a processor, cause a method to be performed, the method comprising:
   providing bi-directional communication connectivity, via an avionics data processing service (ADPS), between a vehicle, a gateway unit and/or a cloud based computing system, the vehicle having a processor, the processor configured to control one or more on-board avionics control functions of the vehicle using the ADPS to:
transmit, on a day of operation of the vehicle, via a cloud based computing system, data between the gateway unit and the vehicle at least during an initialization process of a flight management system of the vehicle, the data comprising one or more requests related to one or more operations of the vehicle, wherein the initialization process comprises identifying one or more required data portions from the data for the one or more operations of the vehicle based on at least one mission specific descriptor of a flight mission that is currently planned for the vehicle;
validate the transmitted data against an operational parameter corresponding to the one or more operations of the vehicle, wherein the operational parameter is related to the flight mission that is currently planned for the vehicle;
match the operational parameter with a flight operation; and
insert a modified flight operation, based on matching the operational parameter with the flight operation, into the flight management system of the vehicle, wherein the modified flight operation is received from a node associated with the vehicle in the cloud based computing system, and wherein the data comprising the modified flight operation is generated based on the at least one mission specific descriptor of the flight mission that is currently planned.

2. The non-transitory computer-readable medium of claim 1, wherein the processor using the ADPS is further configured to transmit an acknowledgment notification to the cloud based computing system and/or one or more computing systems in communication with the cloud based computing system that the operational parameter has been matched and/or the modified flight operation inserted into the flight management system and wherein a background processing system generates one or more support data elements associated with the modified flight operation in advance of its insertion into the flight management system, based on the identified mission-specific descriptor.

3. The non-transitory computer-readable medium of claim 1, wherein the ADPS is resident to a computing system of the vehicle or resident to a computing system in remote communication with the vehicle via the cloud based computing system.

4. The non-transitory computer-readable medium of claim 1, wherein the ADPS is a separately space and time partitioned multi-mode data acquisition agent configured to control one or more avionics onboard the vehicle for on-board avionics control functions.

5. The non-transitory computer-readable medium of claim 1, wherein the processor using the ADPS transmits the data comprising the one or more requests.

6. The non-transitory computer-readable medium of claim 1, wherein the processor using the ADPS is further configured to:
in response to determining that the modified flight operation has been successfully accessed and/or activated by the flight management system of the vehicle, remove the modified flight operation from the cloud based computing system.

7. The non-transitory computer-readable medium of claim 1, wherein the step of transmitting the data comprises:
identifying data for a predetermined vehicle operation; and
selectively retrieving predetermined vehicle operation data from one or more databases of the cloud based computer system to execute the predetermined vehicle operation.

8. The non-transitory computer-readable medium of claim 1, wherein the processor using the ADPS is further configured to cause the one or more requests to be received by the flight management system during or just prior to the flight operation so that a gateway communication interface of the vehicle connects to the cloud based computing system and searches for data relevant to the one or more requests.

9. The non-transitory computer-readable medium of claim 1, wherein the processor using the ADPS is further configured to:
selectively retrieve, from one or more databases connected to the cloud based computing system, one or more discrete entries associated with the flight operation and/or historical vehicle performance data of the vehicle; and
insert the retrieved one or more discrete entries into the flight management system of the vehicle.

10. The non-transitory computer-readable medium of claim 1, wherein the processor using the ADPS is further configured to:
automatically transmit one or more current vehicle operations data to at least one digital twin of the cloud based computing system rendering accessible the one or more current vehicle operations data by one or more computing systems in communication with the cloud based computing system.

11. The non-transitory computer-readable medium of claim 1, wherein the flight management system is onboard the vehicle, and wherein the processor using the ADPS is further configured to synchronize the transmitted data and the modified flight operation between the flight management system, a gateway interface device, and the cloud based computing system in real-time and/or at one or more predetermined intervals.

12. The non-transitory computer-readable medium of claim 11, wherein the gateway interface device provides connectivity between a plurality of nodes of the cloud based computing system and the flight management system by functioning as an access point.

13. The non-transitory computer-readable medium of claim 12, wherein the ADPS communicates with at least one node of the plurality of nodes of the cloud computing system directly through the gateway interface.

14. The non-transitory computer-readable medium of claim 1, wherein the one or more requests are received from a client application executed on a mobile device, an aircraft LRU system that is external to the flight management system, a ground based computing system, and/or another cloud based computing system.

15. A method, comprising:
processing, on a day of operation of a first vehicle, by a first digital twin of a cloud based computing system, a first request received from and/or sent to a gateway unit associated with a first vehicle, the first request comprising data related to one or more first vehicle operations, wherein the first request received at least during an initialization process of a flight management system of the first vehicle, wherein the initialization process comprises identifying one or more required data portions from the data for the one or more first vehicle operations based on at least one mission specific descriptor of a flight mission that is currently planned for the vehicle;

validating, by a first avionics data processing service (ADPS) in communication with the gateway unit, the first request against an operational parameter corresponding to the one or more vehicle operations, wherein the operational parameter is related to the flight mission that is currently planned for the first vehicle;

upon validating the first request, matching, by the first ADPS, the operational parameter with a flight operation; and upon matching the operational parameter with the flight operation, inserting, by the first ADPS, a modified flight operation into the flight management system of the first vehicle, wherein the modified flight operation is received from a node associated with the first vehicle in the cloud based computing system, and wherein the data comprising the modified flight operation is generated based on the at least one mission specific descriptor of the flight mission that is currently planned.

16. The method of claim 15, further comprising:

processing, by a second digital twin of the cloud based computing system, a second request received from and/or sent to a second gateway unit associated with a second vehicle, the second request comprising data related to one or more second vehicle operations;

validating, by a second avionics data processing service (ADPS) in communication with the second gateway unit, the second request against a second operational parameter corresponding to the one or more second vehicle operations;

upon validating the second request, matching, by the second ADPS, the second operational parameter with a second flight operation; and upon matching the second operational parameter with the second flight operation, inserting, by the second ADPS, a second modified flight operation into the flight management system of the second vehicle.

17. The method of claim 16, further comprising:

transmitting, by the first and/or second ADPS, an acknowledgment notification to a respective first and/or second digital twin that the operational parameter has been matched and/or the respective first and/or second modified flight operation inserted into the flight management system of the first and/or second vehicle and wherein a background processing system generates one or more support data elements associated with the modified flight operation in advance of its insertion into the flight management system, based on the identified mission-specific descriptor.

18. The method of claim 15, further comprising:

upon determining that the modified flight operation has been accessed and/or activated by the flight management system of the first vehicle, removing the modified flight operation, by the first ADPS, from the cloud based computing system.

19. A network node on an aircraft comprising:

an onboard flight management system (FMS);

an FMS service layer comprising a networked node server, the networked node server configured to:

process, on a day of operation of an aircraft, by a first digital twin, a first request received from and/or sent to a gateway unit associated with the aircraft, the request comprising data related to one or more aircraft operations, wherein the first request received at least during an initialization process of the flight management system of the aircraft, wherein the initialization process comprises identifying one or more required data portions from the data for the one or more aircraft operations based on at least one mission specific descriptor of a flight mission that is currently planned for the vehicle;

validate, by an avionics data processing service (ADPS) in communication with the gateway unit, the first request against an operational parameter corresponding to the one or more aircraft operations, wherein the operational parameter is related to the flight mission that is currently planned for the aircraft;

upon validating the first request, match, by the ADPS, the operational parameter with a flight operation; and upon matching the operational parameter with the flight operation, insert, by the ADPS, a modified flight operation into the onboard flight management system of the aircraft, wherein the modified flight operation is received from a node associated with the aircraft in a cloud based computing system, and wherein the data comprising the modified flight operation is generated based on the at least one mission specific descriptor of the flight mission that is currently planned.

20. The network node of claim 19, wherein the networked node server is configured to transmit, by the ADPS, an acknowledgment notification to the first digital twin that the operational parameter has been matched and/or the modified flight operation inserted into the onboard flight management system and wherein a background processing system generates one or more support data elements associated with the modified flight operation in advance of its insertion into the flight management system, based on the identified mission-specific descriptor.

* * * * *